Aug. 4, 1953 — C. A. CHAYNE — 2,647,789
VEHICLE DOOR LOCKING MEANS
Filed Feb. 10, 1951 — 2 Sheets-Sheet 1
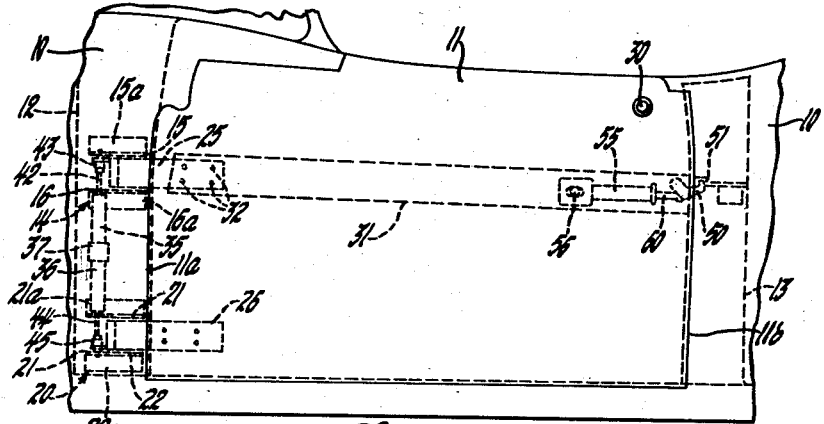
Fig. 1
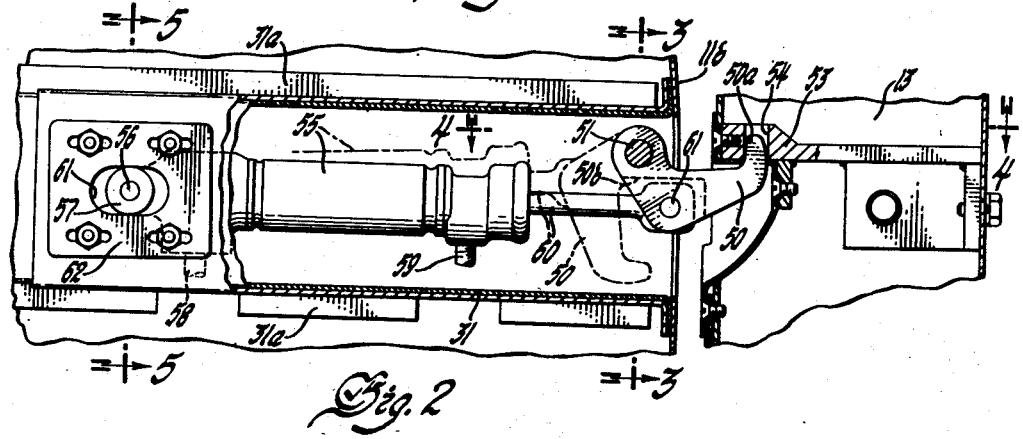
Fig. 2
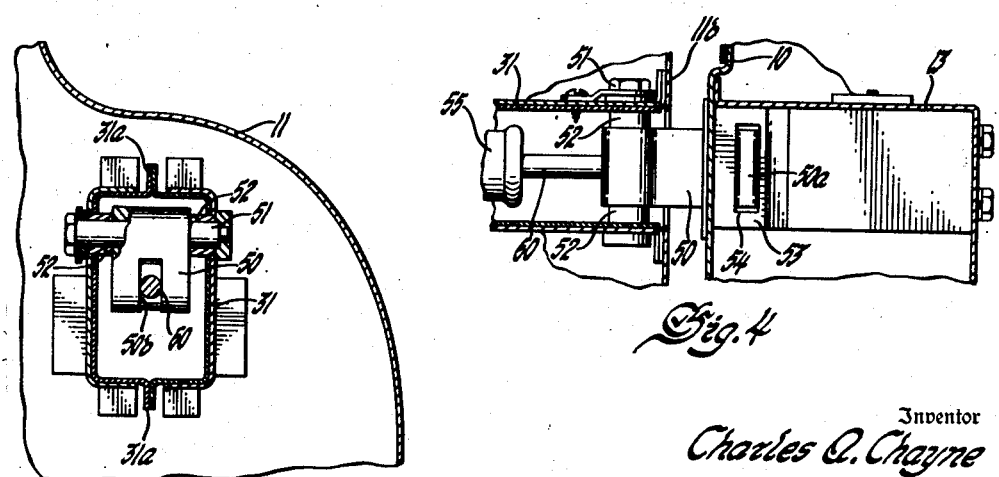
Fig. 3
Fig. 4
Inventor
Charles A. Chayne
By Willet, Helmig & Baillio
Attorneys Aug. 4, 1953     C. A. CHAYNE     2,647,789
VEHICLE DOOR LOCKING MEANS
Filed Feb. 10, 1951     2 Sheets-Sheet 2

Inventor
Charles A. Chayne
By Willits, Helmig & Baillio
Attorneys

Patented Aug. 4, 1953

2,647,789

UNITED STATES PATENT OFFICE 2,647,789

VEHICLE DOOR LOCKING MEANS

Charles A. Chayne, Flint, Mich., assignor to General Motors Corporation, Detroit, Mich., a corporation of Delaware Application February 10, 1951, Serial No. 210,296

13 Claims. (Cl. 296—44)

This invention relates to a vehicle door locking means, and more particularly to an auxiliary locking means for a vehicle door.

One feature of the invention is that it provides an improved door locking means; another feature of the invention is that it provides means for locking a vehicle door to both front and rear door pillars; a further feature of the invention is that it provides a reinforcing beam mounted on the door and extending thereacross, and readily releasable means having portions connected to said beam for locking said door to both front and rear door pillars, whereby any opening stress on said door is distributed between both pillars; still another feature of the invention is that it provides hydraulic operating means for the locking means; and yet a further feature of the invention is that it provides means for locking the door hinges at points spaced from the hinge pins.

Figure 5:
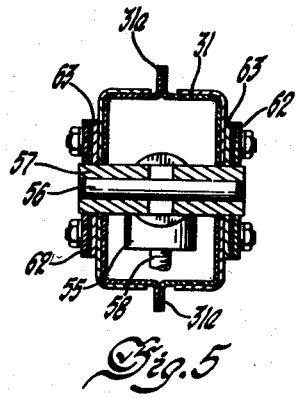
Figure 7:
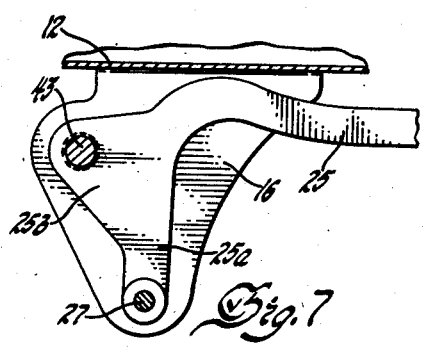
Figure 8:
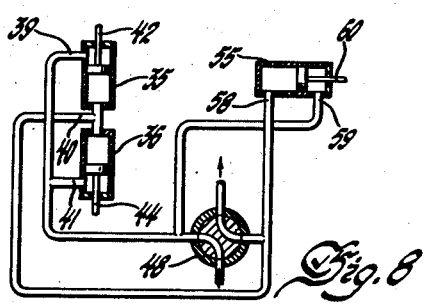
Figure 6:
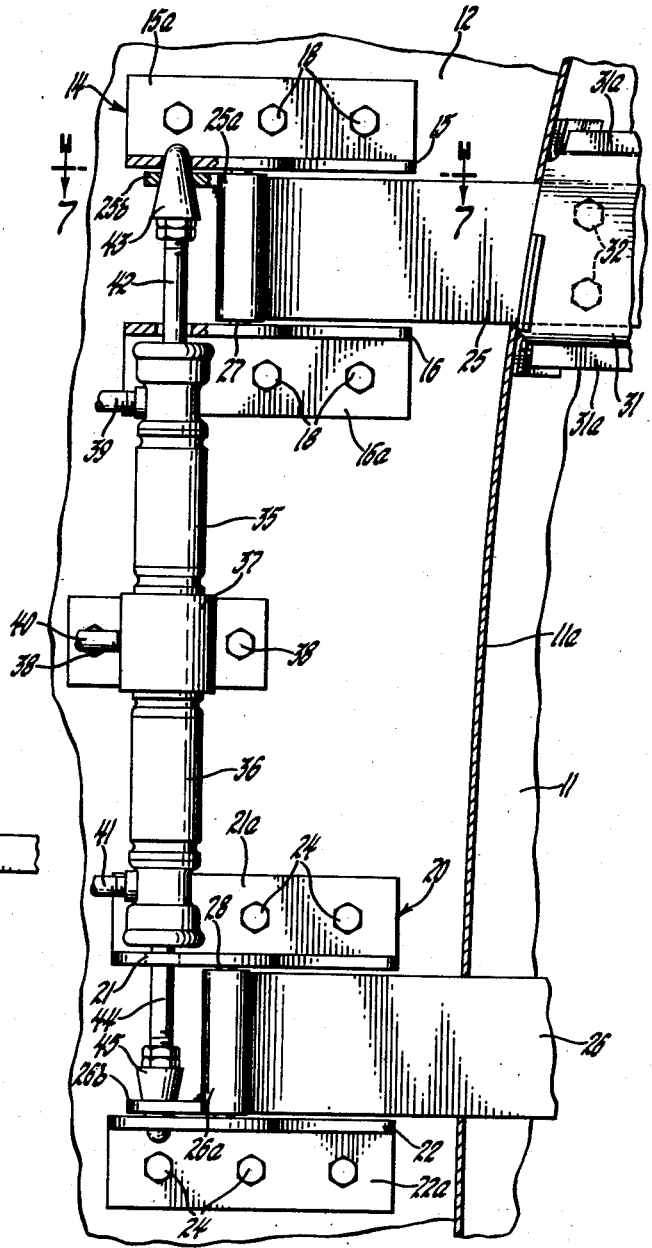

Other features and advantages of the invention will appear from the following description and from the drawings, in which:

Fig. 1 is a fragmentary side elevational view of an automobile provided with the improved door locking means; Fig. 2 is an enlarged fragmentary longitudinal vertical section taken through a portion of the door and rear pillar of the automobile, of Fig. 1, parts being shown in locked position in solid lines and in unlocked position in broken lines; Fig. 3 is a fragmentary section taken along the line 3—3 of Fig. 2; Fig. 4 is a fragmentary section taken along the line 4—4 of Fig. 2; Fig. 5 is a fragmentary section taken along the line 5—5 of Fig. 2; Fig. 6 is an enlarged fragmentary longitudinal vertical section taken through a portion of the front pillar and door of the automobile of Fig. 1; Fig. 7 is a fragmentary section taken along the line 7—7 of Fig. 6; and Fig. 8 is a schematic diagram of a hydraulic operating system.

Conventional automobile construction provides a body having spaced front and rear door pillars and a door hingedly mounted on one pillar for movement between open and closed positions and adapted to extend to the other pillar when in closed position. The side of the door opposite the hingedly mounted side is provided with manually operable means for locking said last mentioned side of the door to the adjacent door pillar when the door is closed, this locking means normally being operable by a handle or push button.

In the event the automobile is subjected to certain strains it is possible that the conventional locking means may accidentally become unlatched, permitting the door to open. This is particularly undesirable when the automobile is travelling at high speeds. The probability of accidental unlatching is increased in convertible type automobiles where no rigid support is provided at the top of the door.

I have devised and am herein disclosing and claiming an improved auxiliary locking means for positively locking the door to both front and rear door pillars, this locking means being mechanically actuated, as, for example, by hydraulic means. My invention additionally provides a reinforcing beam mounted on the door and extending thereacross, and the locking means have portions connected to the beam adjacent opposite sides of the door for locking the door to both front and rear door pillars so that any opening strain which is exerted when the door is locked is distributed between the front and rear door pillars and the door is thereby made effectively an integral part of the automobile body.

Referring now more particularly to the drawings, one side of an automobile body is fragmentarily shown at 10 in Fig. 1. The body is provided with an opening in which is mounted a door 11 having a front side 11a and a rear side 11b, the door being hingedly mounted to a front door pillar 12 which extends vertically within the body panel adjacent the front edge of said opening. A rear door pillar 13 is provided within the body panel adjacent the rear side of the opening.

The door 11 is mounted by means of a pair of vertically spaced hinges, each having a stationary member mounted on the front door pillar and a movable tongue member mounted on the door (Figs. 1 and 6). The stationary member of the upper hinge is designated generally at 14 and comprises sides 15 and 16, said sides having outwardly bent flanges 15a and 16a which are secured to the front door pillar by means of bolts 18. The lower hinge stationary member is similar to the stationary member of the upper hinge, being designated generally at 20 and comprising sides 21 and 22 having flanges 21a and 22a secured to the pillar 12 by means of bolts 24.

The movable or tongue hinge portions are designated at 25 and 26 respectively and are of gooseneck conformation as is conventional in the art, each movable portion being secured at one end to one of the stationary hinge portions by means of hinge pins 27 and 28 respectively. The bent or "gooseneck" ends of the movable hinge members are designated at 25a and 26a respectively (see also Fig. 7).

The door 11 may be provided with conventional door locking means (not shown) which is manually operated by a push button 30. The improved door locking means which comprise the invention may, if desired, be used without the conventional locking means or the novel locking means may be auxiliary to the conventional locking means to provide a positive lock to secure the door to both front and rear door pillars and effectively make the door an integral part of the vehicle body.

A reinforcing beam 31 is mounted on the door on the inside of the outer door panel by means of bolting flanges 31a and extends substantially across the door to points closely adjacent the front and rear door pillars when the door is closed, as shown in Fig. 1. The movable hinge portion 25 is mounted on the beam 31 adjacent its front end by means of bolts 32, while the movable hinge portion 26 is bolted or otherwise secured to the door in conventional manner.

Means are provided for locking the front side 11a of the door to the front pillar. The gooseneck portion 25a of the movable hinge member 25 is provided with an ear 25b, and this ear and the hinge side portion 15 are provided with openings which are aligned when the door is closed. These openings preferably are tapered as illustrated to provide a single frusto-conical aperture when the door is closed, the larger end being in the ear 25b. Similarly, the gooseneck portion 26a of the stationary movable hinge member 26 is provided with an ear 26b, this ear and a complementary portion of the hinge side 22 being provided with aligned openings which are tapered, the larger aperture being in ear portion 26b.

A pair of hydraulic piston and cylinder devices 35 and 36 are mounted in the pillar 12 by means of a mounting bracket 37 which is secured to the pillar by bolts 38. Fluid may be delivered to these devices through pipes 39, 40, and 41 and a reversing valve 48 (Fig. 8) from a pump or fluid reservoir in conventional manner. Conventional control means for the valve 48, as a solenoid, (not shown) may be provided if desired. The cylinder 35 has projecting from its upper end a piston rod 42 on the end of which is threaded a tapered dowel 43 adapted to enter and wedge in the algined apertures in the tongue 25b and hinge side 15 to lock the hinge at a point spaced from the hinge pin 27. In order to unlock the hinge, rod 42 and dowel 43 are retracted toward the cylinder by pressure from fluid entering pipe 39. The cylinder 36 has projecting from its lower end a piston rod 44 on to which a tapered dowel 45 is threaded, this dowel being adapted to enter and wedge in the frusto-conical aperture formed by the aligned openings in the tongue 26b and hinge side 22 to lock the lower hinge at a point spaced from the hinge pin 28. In order to unlock the lower hinge the valve 48 is moved to the position of Fig. 8 and the rod 44 is retracted toward the cylinder 36 by pressure from fluid entering the pipe 41. With the valve in the position other than that shown in Fig. 8 both hinges may be locked simultaneously by pressure from fluid entering the cylinders 35 and 36 through pipe 40.

Referring more particularly to Figs. 2, 3, 4 and 5, a latch 50, which is channel shaped in transverse section and is formed as a bellcrank, is pivotally mounted at one of its ends within the beam 31 on a pin 51 which extends between opposite walls of the box-like beam 31 and which mounts a spacer 52 for pivotally supporting the latch 50. Within the rear pillar 13 is a catch 53 having therein an elongated aperture 54 for reception of the hook-shaped end 50a of the latch member 50.

A hydraulic cylinder and piston device 55 is pivotally mounted within the beam 31 by means of pin 56 which is journalled in a bushing 57, both the pin and the bushing extending between opposite walls of the beam 31 in slots 61 provided in adjustable mounting plates 62 and 63. The slots permit vernier adjustment of the position of the pivotal axis for the cylinder 55 as the mounting plates are adjusted during assembly. Fluid is delivered to the cylinder 55 by means of pipes 58 and 59 which may be supplied through valve 48 from a pump or fluid reservoir and suitable hydraulic controls as a solenoid may be provided as desired.

The piston and cylinder device 55 is provided with a piston rod 60 which projects through a slot 50b in the latch member 50 and which is an enlarged head pivotally secured to the latch by means of a pin 61 journalled in the opposite walls of the channel-shaped latch.

When fluid is fed to the cylinder 55 through the pipe 58 the piston rod 60 is forced outwardly to the position shown in solid lines in Fig. 2, pivoting the latch into engagement with the catch 53. When the valve 48 is moved to the position shown in Fig. 8 and the control means is actuated, fluid is fed through the cylinder through the pipe 59 and the rod is retracted to its broken line position of Fig. 2 and the latch is unlatched. The pivotal mounting of the cylinder permits movement thereof between the solid and broken line positions of Fig. 2.

If desired, the hydraulic operating mechanism shown in Fig. 2 may be interconnected with the mechanism shown in Fig. 5 so that both locks are operated simultaneously. Fig. 8 schematically shows such an arrangement. Inasmuch as conventional automobiles are provided with a reinforcing beam which may be similar to the beam 31 and which extends throughout the length of the body exclusive of the doors, locking the doors by means of the improved locking means above described (which are connected to the reinforcing beam 31) distributes any opening strain to both front and rear pillars, and consequently to the entire body through the conventional reinforcing beams. The door, when locked, is thus effectively an integral part of the body structure and it is impossible for the door to be inadvertently swung open or torn from its hinges.

While I have shown and described one embodiment of my invention, it is subject to many modifications. Changes, therefore, in the construction and arrangement may be made without departing from the spirit and scope of the invention as set forth in the appended claims.

I claim:

1. In a vehicle, apparatus of the character described, including: a first door pillar; a second door pillar spaced from said first door pillar; a door hingedly mounted on one pillar for movement between open and closed positions and adapted to extend to a position adjacent the other pillar when in closed position; a reinforcing beam mounted on said door and extending thereacross; and readily releasable means having portions connected to said beam for locking said door to both said pillars.

2. In a vehicle, apparatus of the character described, including: a first door pillar; a second door pillar spaced from said first door pillar; a door hingedly mounted on one pillar for movement between open and closed positions and adapted to extend to the other pillar when in closed position; a reinforcing beam mounted on said door and extending thereacross; readily releasable means having portions conected to said beam for locking said door in both said pillars; and hydraulic operating means for said locking means.

3. In a vehicle, apparatus of the character described, including: a first door pillar; a second door pillar spaced from said first door pillar; a door adapted to extend from said first pillar to said second pillar when in closed position; hinge means for mounting said door on one of said pillars for swinging movement between open and closed positions, said hinge means having a hinge member mounted on one of said pillars, a hinge member mounted on said door, and pivotal connecting means between said members; and means for locking said hinge members together at a point spaced from said pivotal connection when the door is closed.

4. In a vehicle, apparatus of the character described, including: a front door pillar; a rear door pillar spaced from said front door pillar; a door adapted to extend from said front pillar to said rear pillar when in closed position; a reinforcing beam mounted on said door and extending thereacross; hinge means for mounting said door on one of said pillars for swinging movement between open and closed positions, said hinge means comprising a hinge member mounted on one of said pillars, a hinge member mounted on said beam, and a hinge pin pivotally connecting said members; and readily releasable means for locking said hinge members together at a point spaced from said pin when the door is closed.

5. In a vehicle, apparatus of the character described, including: a front door pillar; a rear door pillar spaced from said front door pillar; a door adapted to extend from said front pillar to said rear pillar when in closed position; a reinforcing beam mounted on said door and extending thereacross; hinge means for mounting said door on one of said pillars for swinging movement between open and closed positions, said hinge means comprising a hinge member mounted on one of said pillars, a hinge member mounted on said beam, and a hinge pin pivotally connecting said members; readily releasable means for locking said hinge members together at a point spaced from said pin when the door is closed; and hydraulic operating means for said locking means.

6. In a vehicle, apparatus of the character described, including: a front door pillar; a rear door pillar spaced from said front door pillar; a door adapted to extend from said front pillar to said rear pillar when in closed position; hinge means for mounting said door on one of said pillars for swinging movement between open and closed positions, said hinge means having a hinge member mounted on one of said pillars, a hinge member mounted on said door, and pivotal connecting means between said members, said members having openings which are aligned when the door is closed; and a hydraulic cylinder and piston device mounted on said last mentioned pillar, said device having a dowel adapted to enter said openings to lock said hinge members together when the door is closed.

7. In a vehicle, apparatus of the character described, including: a front door pillar; a rear door pillar spaced from said front door pillar; a door adapted to extend from said front pillar to said rear pillar when in closed position; a reinforcing beam mounted on said door and extending thereacross; hinge means for mounting said door on one of said pillars for swinging movement between open and closed positions, said hinge means comprising spaced stationary hinge members mounted on one of said pillars, a first movable hinge member mounted on said beam, a second movable hinge member mounted on said door, said hinge pin means pivotally connecting said respective movable members with complementary ones of said stationary members, said complementary movable and stationary members having tapered openings which are aligned when the door is closed; and at least one hydraulic cylinder and piston device mounted on said last mentioned pillar, said device having tapered dowels each adapted to enter and wedge in said aligned openings to lock said hinge members together when the door is closed.

8. In a vehicle, apparatus of the character described, including: a front door pillar; a rear door pillar spaced from said front door pillar; a door adapted to extend from said front pillar to said rear pillar when in closed position; a reinforcing beam mounted on said door and extending thereacross; hinge means for mounting said door on one of said pillars for swinging movement between open and closed positions, said hinge means comprising a spaced pair of stationary hinge members mounted on one of said pillars, a first movable hinge member mounted on said beam, a second movable hinge member mounted on said door, and hinge pin means pivotally connecting said respective movable members with complementary ones of said stationary members, said complementary movable and stationary members having tapered openings which are aligned when the door is closed to form a frusto-conical aperture; a pair of hydraulic cylinder and piston devices mounted on said last mentioned pillar, each device having a movable portion with a tapered dowel adapted to enter and wedge in one of said frusto-conical apertures to lock said complementary hinge members together when the door is closed; a latch mounted on said beam adjacent said other pillar; a catch member on said other pillar adapted to cooperate with said latch; a hydraulic cylinder and piston device mounted on said beam and connected to said latch for operation thereof between latched and unlatched positions; and common operating means for said hydraulic devices.

9. In a vehicle, apparatus of the character described, including: a first door pillar; a second door pillar spaced from said first door pillar; a door hingedly mounted on one of said pillars for movement between open and closed positions and adapted to extend to the other pillar when in closed position; readily releasable means in the pillar on which said door is mounted for locking said door in closed position; and hydraulically operated means for locking said door to said other pillar when in closed position.

10. In a vehicle, apparatus of the character described, including: a front door pillar; a rear door pillar spaced from said front door pillar; a door hingedly mounted on one of said pillars for movement between open and closed positions and adapted to extend to the other pillar when in closed position; a reinforcing beam mounted on said door and extending thereacross; readily releasable means in said first mentioned pillar and connected to one end of said beam for locking said door in closed position; and readily releasable means connected to the other end of said beam for locking said door to the other pillar when in closed position.

11. In a vehicle, apparatus of the character described, including: a front door pillar; a rear door pillar spaced from said front door pillar; a door adapted to extend from said front pillar to said rear pillar when in closed position; a reinforcing beam mounted on said door and extending thereacross; hinge means for mounting said door on said front pillar for swinging movement between open and closed positions, said hinge means comprising a hinge member mounted on said front pillar, a hinge member mounted on said beam, and a hinge pin pivotally connecting said members; means for locking said hinge members against relative movement when the door is closed; a latch pivotally mounted on said beam adjacent said rear pillar; a catch member on said rear pillar adapted to cooperate with said latch; and means on said beam for operating said latch between latched and unlatched positions.

12. In an automobile having a front door pillar, a rear door pillar spaced from said front door pillar and a door hingedly mounted on one pillar for movement between open and closed positions and adapted to extend to the other pillar when in closed position, locking apparatus of the character described, including: a reinforcing beam mounted on said door and extending thereacross to points closely adjacent said pillars when the door is closed; means having a portion connected to said beam for locking one side of said door to the front pillar; and means having a portion connected to said beam for locking the other side of said door to the rear pillar.

13. In an automobile having a front door pillar, a rear door pillar spaced from said front door pillar, a door, and hinge means for mounting said door on said front pillar for movement between open and closed positions and adapted to extend to said rear pillar when in closed position, locking apparatus of the character described, including: a reinforcing beam mounted on said door and extending thereacross to points closely adjacent said pillars when the door is closed; means in said front pillar for locking said hinge to secure one side of said door immovably to the front pillar; means having a portion connected to said beam for locking the other side of said door to the rear pillar; and common hydraulic operating means for both said locking means.

CHARLES A. CHAYNE.

References Cited in the file of this patent

UNITED STATES PATENTS

| Number | Name | Date |
|--------|------|------|
| 598,647 | Schade | Feb. 8, 1898 |
| 1,492,606 | Robinson | May 6, 1924 |
| 1,555,174 | Williams | Sept. 29, 1925 |
| 1,570,388 | Miller | Jan. 19, 1926 |
| 1,620,615 | Lambert | Mar. 8, 1927 |
| 2,219,344 | Taylor | Oct. 29, 1940 |
| 2,509,623 | Baade | May 30, 1950 |

FOREIGN PATENTS

| Number | Country | Date |
|--------|---------|------|
| 104,793 | Austria | Nov. 25, 1926 |